United States Patent
Morris

Patent Number: 5,669,354
Date of Patent: Sep. 23, 1997

[54] ACTIVE DRIVELINE DAMPING

[75] Inventor: Robert Leonard Morris, Livonia, Mich.

[73] Assignee: General Motors Corporation, Detroit, Mich.

[21] Appl. No.: 634,322

[22] Filed: Apr. 18, 1996

[51] Int. Cl.$^6$ .............................. F02P 5/15; F02D 41/02
[52] U.S. Cl. ........................................ 123/419; 123/436
[58] Field of Search ............................... 123/419, 436

[56] References Cited

U.S. PATENT DOCUMENTS

| | | | |
|---|---|---|---|
| 4,357,662 | 11/1982 | Schira et al. | 364/431.08 |
| 4,509,477 | 4/1985 | Takao et al. | 123/419 |
| 4,535,406 | 8/1985 | Johnson | 364/431.08 |
| 4,893,244 | 1/1990 | Tang et al. | 364/431.03 |

OTHER PUBLICATIONS

U.S. application No. 08/267,320, Marsh et al, filed Jun. 28, 1994.

U.S. application No. 08/482,463, Phillips et al, filed Jun. 8, 1995.

*Primary Examiner*—Andrew M. Dolinar
*Attorney, Agent, or Firm*—Michael J. Bridges

[57] ABSTRACT

Internal combustion engine torque control for damping undesirable engine speed variation measures the variation as a high frequency engine speed variation at a known engine operating angle and, for each cylinder combustion event while the variation is present, calculates a phase-compensated desired torque change to dampen the engine speed variation by projecting the engine speed variation phase at the known engine operating angle to the phase at a next combustion event, and to calculate an opposing cylinder output torque change to dampen the engine speed variation phase at that next combustion event. The torque change is then carried out through ignition timing variation at the combustion event or through variation in the amount of fuel delivered for ignition at the combustion event.

12 Claims, 4 Drawing Sheets

ACTIVE DRIVELINE DAMPING

FIELD OF THE INVENTION

This invention relates to internal combustion engine control and, more particularly, to internal combustion engine driveline damping through dynamic engine output torque control.

BACKGROUND OF THE INVENTION

At low automotive vehicle speeds, a phenomena called chuggle can occur when the torque converter clutch TCC is locked, characterized by periodic perceptible engine torque perturbations which can undermine confidence in vehicle and engine stability. Chuggle is avoided by restricting TCC lockup to higher speeds, which can result in a sacrifice to engine fuel economy. It would be desirable to compensate for chuggle so that TCC lockup may occur even at low vehicle speeds to improve engine fuel economy without loss of confidence in vehicle or engine stability. It would further be desirable to compensate for chuggle without adding significantly to the cost or complexity of the vehicle.

Various "anti-chuggle" controls have been proposed, including those of U.S. applications Ser. No. 08/267,320, filed Jun. 28, 1994, now U.S. Pat. No. 5,573,474 and Ser. No. 08/482,463, filed Jun. 8, 1995, both assigned to the assignee of this application, and those of U.S. Pat. No. 4,535,406. These prior controls generate an engine torque variation signals as a function of a determined variation in engine speed, and apply the torque variation to dampen the chuggle condition. Such controls suffer the shortcoming of applying the torque variation at an improper phase relative to the engine operating angle, to properly compensate the chuggle condition. Engine torque is varied through application of the torque variation, but at a time mismatched to the actual time that the compensation is needed. For example, the engine speed oscillation corresponding to the chuggle condition may peak between engine cylinder ignition or fueling events. The prior controls may be limited to application of the torque variation at one ignition or fueling event, and therefore cannot be applied to dampen the chuggle condition during its peak period. Further, the timing of application of the torque variation by the prior controls approaches is carried out with phase lag and cannot apply the torque variation with phase lead. However, phase lead is required to compensate certain chuggle conditions, such as those occurring at low engine speed conditions.

It would therefore be desirable to provide an anti-chuggle compensation that accurately targets the torque compensation to most effectively dampen the chuggle condition, even if such compensation would require application of the torque compensation between ignition or fueling events, and that provides for both phase lag and phase lead compensation.

SUMMARY OF THE INVENTION

The present invention provides for effective compensation of powertrain chuggle conditions at minimum cost. The compensation takes the form of engine output torque compensation, provided on an engine event by engine event basis during engine operating conditions in which significant chuggle conditions are known to be present, to minimize the torque perturbations associated with chuggle. TCC lockup may then be applied without chuggle constraints, for example so that fuel economy improvements may be realized.

More specifically, a speed error term is periodically generated defining a difference between actual and desired engine speed. The magnitude of the speed error indicates chuggle intensity. The speed error term is applied to a digital phase compensator for generating the amount of compensating engine output torque to mitigate the chuggle condition. The digital phase compensator further accounts for the phase lead or lag that occurs between the time of the torque change request to the time that the compensation will result in an engine output speed change, so that the compensating torque change will precisely compensate the speed variation present at the time the torque change is applied, which may not be the speed variation present at the time the torque change was calculated. The compensation is synchronized with the operating angle of the engine output shaft, with the phase compensator producing accurate and consistent phase shifting. The phase compensator spreads, if necessary, the compensation across multiple ignition or fueling events for continuous variation in phase shift to provide for precision compensation not limited by the time of any one ignition or fueling event.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
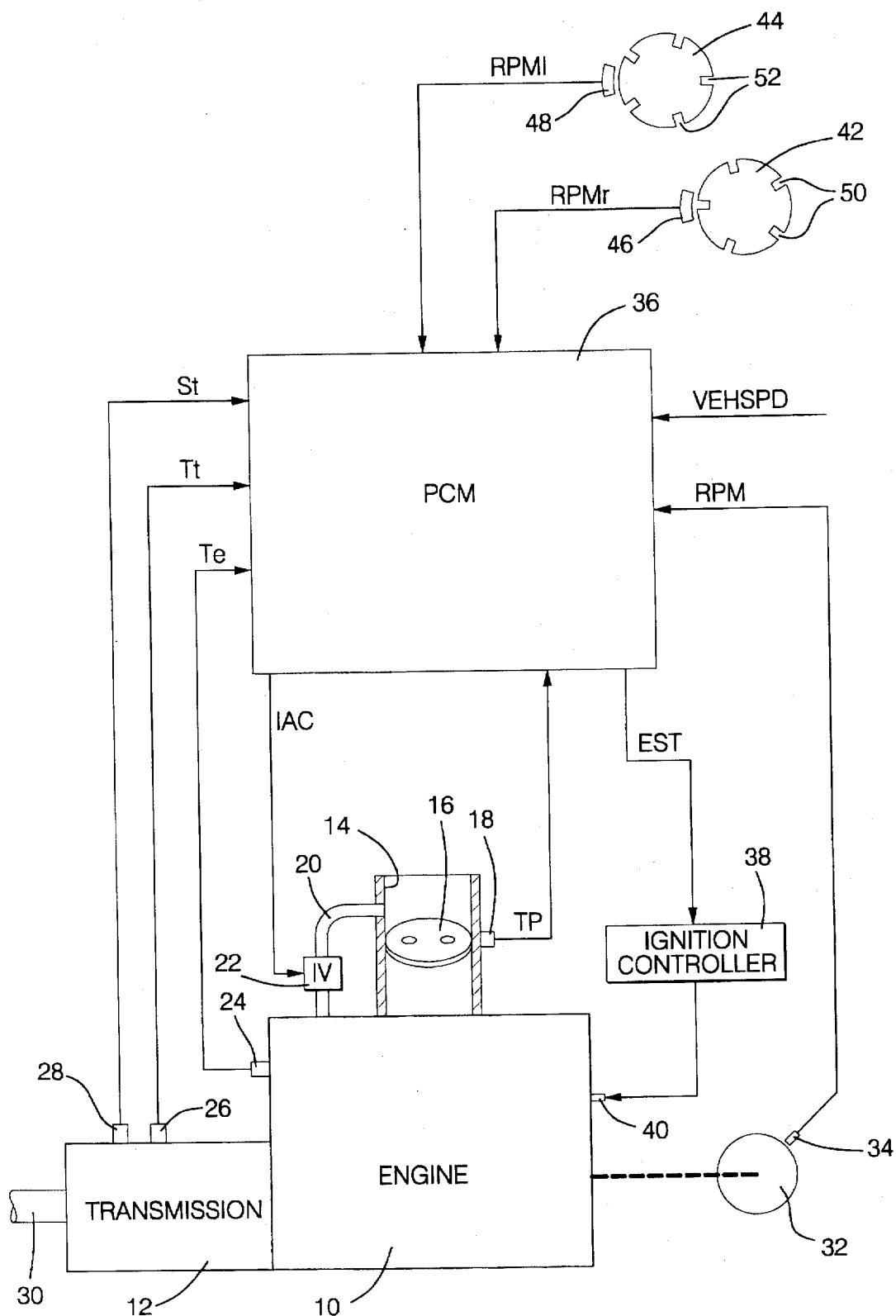
FIG. 1 schematically illustrates the engine and engine control hardware of the preferred embodiment.

Referring to FIG. 1, internal combustion engine 10 is mechanically linked to transmission 12 having output shaft for driving the driven wheels of a vehicle (not shown). The engine 10 receives intake air through an intake air bore 14 in which is disposed intake air valve 16, such as a conventional butterfly or rotary valve for metering intake air to the engine. A degree of opening of the valve 16 is transduced by conventional potentiometric position sensor into output signal TP. An engine output shaft 32 is driven by the engine and includes a plurality of spaced teeth or notches (not shown) about its circumference which pass, during rotation of the output shaft 32 by a stationary Hall effect or variable reluctance sensor 34 which transduces passage of such teeth or notches into cycles of a sensor output signal RPM, wherein the frequency of the signal RPM is proportional to the rate of rotation of the engine output shaft 32 (conventionally termed engine speed) and individual cycles of the signal RPM may be used to indicate relative position of the engine within an engine cycle.

Bypass conduit 20 provides an intake air passage outside the authority of the intake air valve 16, and includes conventional electronically controlled solenoid valve IV 22 for varying restriction of the bypass conduit to intake air passing therethrough. Engine coolant is circulated through the engine via at least one circulation path in which is disposed temperature transducer 24, such as a conventional thermocouple or thermistor for transducing coolant temperature into output signal Te. Likewise, a temperature transducer is situated in a path of circulation (not shown) of coolant through the transmission 12 for transducing transmission coolant temperature into output signal Tt. The transmission includes a plurality of operating states or gears each having a drive ratio between the engine output shaft 32 which is applied to drive the transmission and the transmission output shaft 30. The active state of the transmission, which is the state currently dictating the drive ratio between the shafts 32 and 30, is indicated by output signal St.

An electronic controller PCM 36 is provided to receive the transducer output signals and, through execution of a plurality of operations, to output a series of signals, including control and diagnostic signals for driving various conventional actuators and indicators. For example, an ignition timing control signal EST is generated by the controller 36 and is output to an ignition controller 38. The ignition controller 38 provides for timed output of drive signals to spark plugs 40 for igniting an air/fuel mixture in engine cylinders, wherein the timing is varied in accord with the value of EST. A solenoid valve drive signal IAC is output by controller for varying the degree of opening of the valve 22 to vary engine intake air rate through the bypass conduit 20. The controller receives a VEHSPD input signal indicating vehicle speed. A left vehicle wheel 44, undriven by output shaft 30 in this embodiment, includes a plurality of spaced teeth or notches 52 about a wheel hub rotating with the wheel 44 and a position sensor 48 of the Hall effect or variable reluctance type in proximity to the teeth and not rotating with the hub, for transducing passage of the teeth or notches 52 thereby into output signal RPMl indicating rate of rotation of the undriven left vehicle wheel. Likewise, a right vehicle wheel 42, undriven by output shaft 30 in this embodiment, includes a plurality of spaced teeth or notches 50 about a wheel hub rotating with the wheel 42 and a position sensor 46 of the Hall effect or variable reluctance type in proximity to the teeth and not rotating with the hub, for transducing passage of the teeth or notches 50 thereby into output signal RPMr indicating rate of rotation of the undriven right vehicle wheel.

Figure 2:
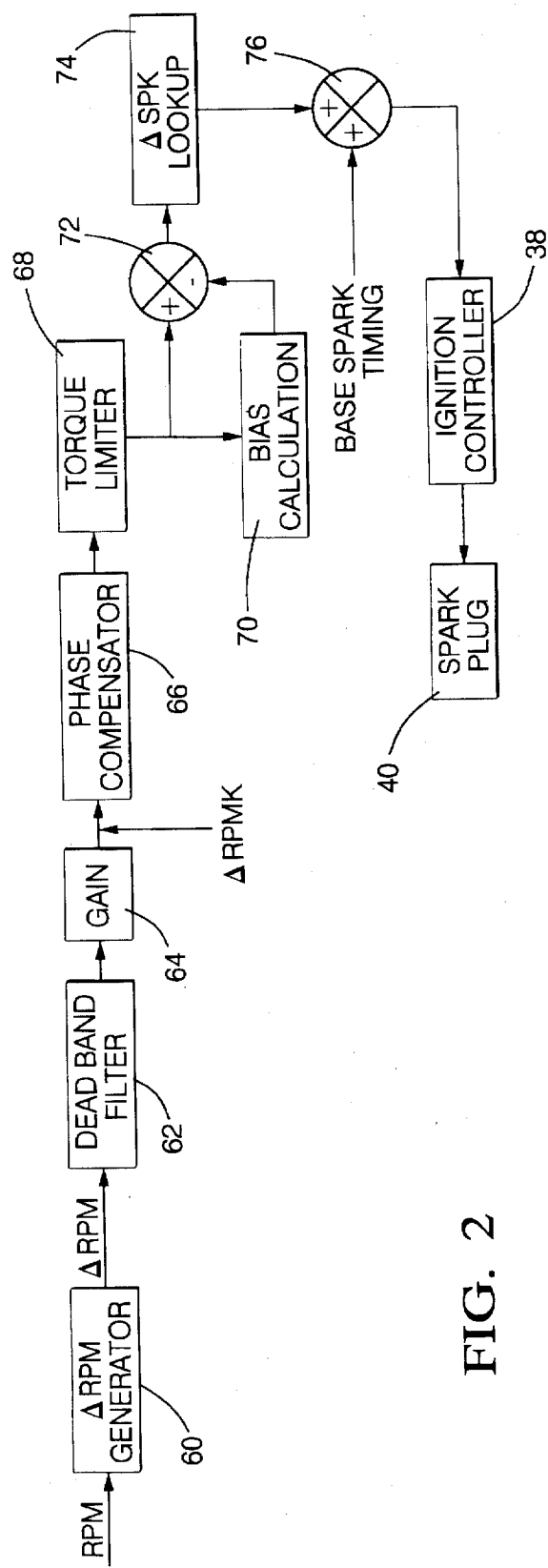
FIG. 2 is a signal flow diagram illustrating signal flow to compensate engine speed variation in accord with this invention.

Referring to FIG. 2, a signal flow diagram illustrates a signal flow process, in accord with a preferred embodiment of this invention, for generating a timed engine control command change for damping torque perturbations in accord with this invention. Engine speed signal RPM is applied to a $\Delta$RPM generator 60 for generating signal $\Delta$RPM representing a time rate of change in RPM. In this embodiment, the $\Delta$RPM generator includes the process illustrated in FIG. 4, wherein signal RPMr is summed with signal RPMl at summing node 90, the sum applied to a gain of 0.5 at gain block 92 to form an average wheel speed which is applied to the current active gear ratio between the engine and the vehicle wheels including the drive ratio of the current active transmission gear and the final drive ratio in this embodiment to form a value representing engine speed, which is subtracted from the measured RPM signal at summing node 96 to form output signal $\Delta$RPM.

Figure 5:
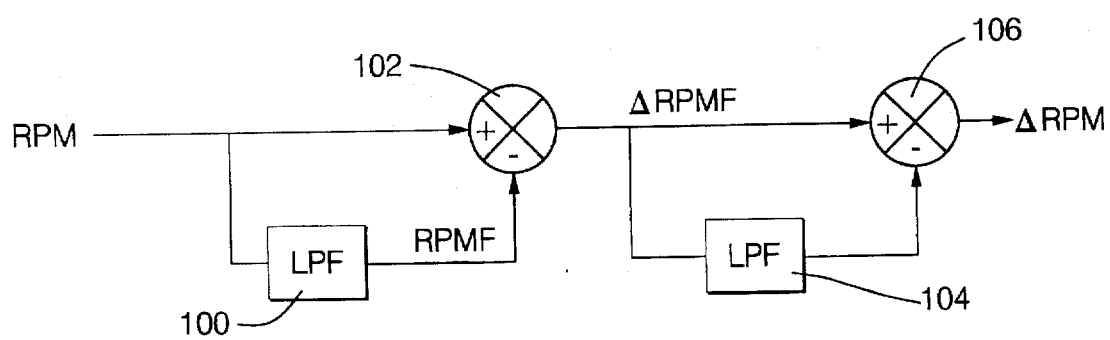

Alternatively, in an embodiment of this invention in which individual wheel speed information is not available or is not to be used for generation of $\Delta$RPM, the signal $\Delta$RPM may be generated through the process of FIG. 5, in which measured signal RPM is passed through a low pass filter process LPF 100 having a predetermined filter coefficient to form RPMF which is subtracted from RPM at summing node 102 to form a filtered value $\Delta$RPMF. The value $\Delta$RPMF is applied to a second low pass filter process LPF 104 with a predetermined filter coefficient to filter change in $\Delta$RPMF and form $\Delta$RPMFF which is subtracted from $\Delta$RPMf at summing node 106 to form $\Delta$RPM. The output $\Delta$RPM decays toward zero when the rate of change in engine speed is about zero or is substantially constant.

Returning to FIG. 4, the signal $\Delta$RPM is next applied to a dead band filter wherein if the magnitude of $\Delta$RPM is within a predetermined range of zero, it is set to zero so that minor engine speed variation, such as engine speed change that is likely to be imperceptible to the vehicle operator, will not result in control command variation. The deadband range in this embodiment is about ±10 r.p.m. A calibration gain is next applied to the output of the deadband filter at gain stage 64 to provide for in-vehicle tuning. The gain K is selected from a stored schedule of gain values as a predetermined function of engine speed and current active transmission gear ratio, indicated by signal St (FIG. 1). The output of the gain stage is next applied to a phase compensator 66 to cancel the phase difference that occurs in the engine, and produce a deviation in engine torque required to dampen driveline oscillations indicated through the signal $\Delta$RPM.

The torque deviation is next limited by torque limiter 68 to predetermined upper and lower torque limits, TQMAX and TQMIN, respectively. The limited torque deviation is next applied to a bias calculation stage 70 in the embodiment in which ignition timing is provided for effecting the required torque deviation, for determining a torque bias value applied to the limited torque deviation at summing node 72. Generally, ignition timing variation is only available for reducing engine torque through the MBT base timing value. The torque bias value is provided as necessary to ensure that spark timing variation is provided for reducing and not for increasing engine torque. Specifically, the torque bias is set to the filtered torque deviation whenever the filtered torque deviation exceeds the torque bias, and otherwise the torque bias will decay gradually toward zero. The torque bias calculation at stage 70 should be set up to that time for the bias to decay to zero is about the same as the time required to dampen driveline oscillations.

The difference between the limited torque deviation and the torque bias value, labeled $\Delta$TQb, is next applied as an index value to a predetermined stored lookup table representing a calibrated relationship between a desired change in engine output torque and the corresponding required change in ignition timing at stage 74, which outputs a signed $\Delta$SPK value representing the change in ignition timing, which is summed with a base ignition timing value generated through a conventional ignition timing control process in accord with ordinary skill in the art, to form an ignition timing command applied to the ignition controller 38 for timed application to individual spark plugs 40 of the engine. The $\Delta$SPK value varies the base ignition timing value to as to adjust, in a precisely timed manner, engine output torque to cancel the phase lag in the engine and significantly dampen driveline oscillations, in accord with this invention.

Figure 4:
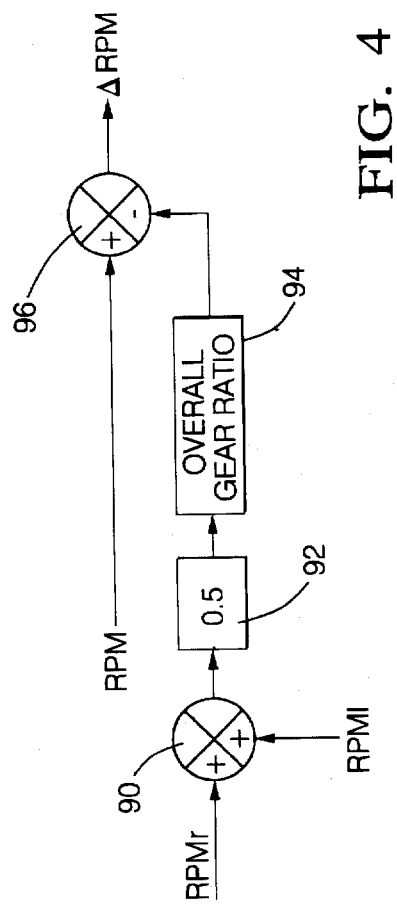
FIGS. 4 and 5 are signal flow diagrams illustrating respective preferred and alternative operations for determining an engine speed difference value.
Figure 3:
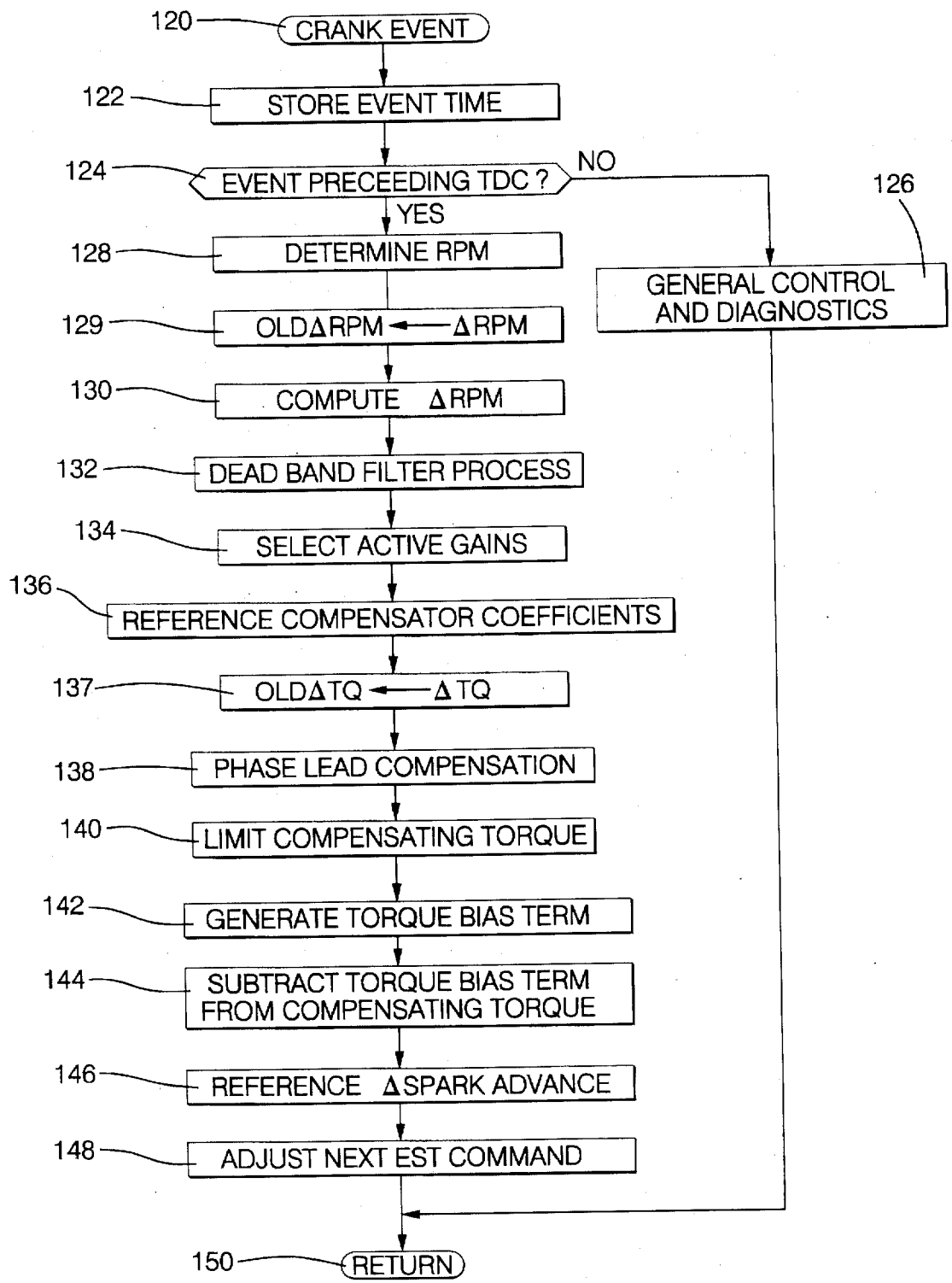
FIG. 3 is a computer flow diagram illustrating a series of operations executed by the control hardware of FIG. 1 for carrying out the engine control of the preferred embodiment.
Figure 6:
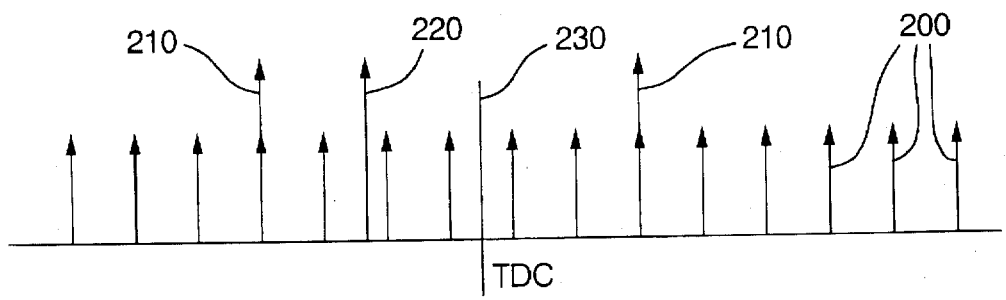
FIG. 6 is a timing diagram illustrating synchronous sampling timing of the preferred embodiment.

Referring to FIG. 3, the specific computer operations for carrying out, in this embodiment, the operations generally illustrated in the various stages of the diagrams of FIG. 2 and FIGS. 4 and 5, are illustrated in a step by step manner, and are initiated at a step 110 upon occurrence of the first reference pulse (which is approximately seventy degrees preceding a cylinder top dead center position in a conventional six cylinder engine). The operations of the routine of FIG. 3 are, in accord with an important aspect of this invention, synchronous with engine events, such as engine cylinder events indicated by passage of teeth or notches on the engine crankshaft 32 (FIG. 1). Such events are indicated in the timing diagram of FIG. 6, each event being indicated by a vertical arrow, such as arrows 200 on the timeline of FIG. 6. Each vertical arrow represents passage of a tooth or notch on the crankshaft 32 of FIG. 1 by the sensor 34 indicating rotation of the engine through a predetermined rotation angle. For example, in the six cylinder engine 10 of this embodiment, there are six such events per cylinder reference period, as illustrated in FIG. 6, or one for each twenty degrees of crankshaft rotation. A crankshaft event interrupt is initiated following passage of at least the event occurring about seventy degrees before the cylinder top dead center position, marked as events 210 in FIG. 6. The interrupt causes the controller PCM 36 (FIG. 1) to suspend any operation and to carry out the operation of FIG. 3 in a step by step manner. Generally, the engine speed is measured, for example as inversely proportional to the difference in the time of occurrence between the event 210 and a most recent prior occurrence of such an event. The timing of the next ignition event, indicated as event 220 of FIG. 6, is varied through a torque deviation determined through execution of the operations of FIG. 6 to compensate for engine speed variation in accord with this invention. The delay between an engine speed measurement and the next torque production event (at the next cylinder top dead center position 230 of FIG. 6) will be maintained through this invention, approximately one-half sample period delay, in which the sample period is equal to the reference period (six events of FIG. 6). The sampling period thus depends on engine speed, and the phase compensator must be determined as a function of engine speed.

Returning to FIG. 3, upon occurrence of a crankshaft event interrupt, the interrupt service routine of FIG. 3 is initiated starting at a step 120 and proceeding to a next step 122 to store the time of the interrupt as the time of the current crankshaft event. Such time may be stored in a conventional random access memory device in the PCM 36 (FIG. 1). If, as determined at a next step 124, the current interrupt does not correspond to the event seventy degrees before cylinder top dead center position, a step 126 is executed to carry out any required conventional engine control and diagnostics operations, such as any required fuel control or intake air control or diagnostics operations, after which the service routine is concluded and returns, via a step 150, to resume any prior ongoing PCM 36 operations that may have been suspended when the crankshaft event interrupt occurred.

Returning to step 124, if the current interrupt corresponds to the event seventy degrees before cylinder top dead center position, engine speed RPM is next determined at a next step 128 as the inverse of the difference between the time of occurrence of the current and most recent prior seventy degrees before top dead center crankshaft event, multiplied by a predetermined constant. A value ΔRPM, stored in PCM memory is next stored as OLDΔRPM at a step 129. A value ΔRPM is next determined and stored in PCM memory to represent a rate of change in engine speed, for example through the process described for FIG. 4 or for FIG. 5. The value ΔRPM is next passed through a deadband filter process at a step 132 in which ΔRPM is set to zero if it is within a predetermined engine speed band around zero to minimize unnecessary compensation. A current active gain is next determined as a function of engine speed and current active gear ratio determined in accord with the value of St of FIG. 1, as described, at a next step 134, to provide for in-vehicle tuning. The gain is determined to correspond to the amount of torque correction for a given engine speed variation. It is determined through a conventional vehicle calibration procedure, for example with a specific powertrain operated on a test stand, by starting, for each of a series of engine speeds and active transmission gears, with a minimum gain which is increased until no further compensation improvement is noticed, with the gain for that speed and gear set to the value determined to correspond to the most effective compensation.

Figure 7:
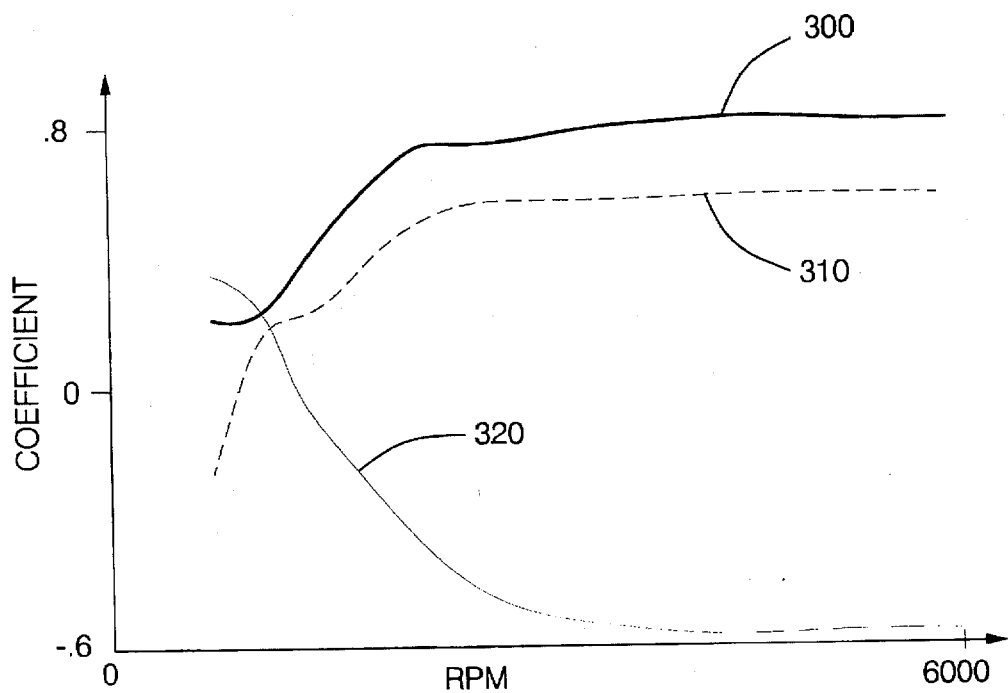
FIG. 7 is a diagram illustrating a relationship between a control parameter and a control coefficient applied in accord with this invention.

Coefficients for a phase compensator are next selected at a step 136 by referencing for the current engine speed and transmission gear, a set of calibrated gains N0, N1, and D1, to be described. These gains are established through a conventional calibration process as required to precisely cancel the phase lag that occurs in the engine. Representative values for such coefficients are illustrated in FIG. 7 for fourth gear, in which curve 300 is for D0, 310 for N0, and 320 for N1. The current value stored in memory and labeled as ΔTQ is next stored as OLDΔTQ at a next step 137. The coefficients are then applied in a phase compensator at a next step 138 to determine and store in PCM memory a torque deviation ΔTQ. The phase compensator may be implemented in any conventional form, such as:

$$\Delta TQ = D0*OLD\Delta TQ + N1*\Delta RPM + N0*OLD\Delta RPM$$

in which Do, No, and N1 are determined at the step 136, OLDΔTQ is a stored most recent prior value of ΔTQ, ΔRPM is the current filtered ΔRPM value, and OLDΔRPM is a most recent prior filtered ΔRPM value. The phase compensator cancels the phase difference occurring in the engine and provides the deviation in engine torque required to dampen driveline oscillations in accord with this invention. The magnitude of engine speed variation is projected by the phase compensator to the precise engine operating angle at which a compensating engine output torque change will occur, which is, in this embodiment, the next cylinder combustion event, to determine the magnitude of the engine speed variation at that engine operating angle, so that a torque change may be determined for that engine operating angle to accurately oppose or dampen the engine speed change.

The determined ΔTQ value is next limited at a step 140 to a predetermined torque range determined as sufficient to provide beneficial damping without significantly depleting engine output power. A torque bias term is then generated at a step 142 to restrict the torque deviation to negative values. The torque bias value generally is set to ΔTQ if ΔTQ exceeds a most recent prior torque bias value, and otherwise the torque bias value is gradually decayed toward zero along a predetermined decay schedule or with a predetermined time rate of decay. The decay rate should be set up so that the total decay time is approximately the same as the time required to substantially dampen engine speed variations. The generated torque bias term is next subtracted from the ΔTQ value at a step 144 and a ΔSPK value representing an ignition timing variation is next determined as a function of the difference, as determined at a next step 146 through application of the difference to a stored lookup table.

A base ignition timing command is next adjusted by the determined ΔSPK command at a step 148 for timed application to a spark plug of a next active engine cylinder. For example, the time of the ignition event of the next active engine cylinder, such as event 220 of FIG. 6 is dictated by the combination of the base ignition timing value and ΔSPK.

The inventor intends that this invention may be applied to compensate a chuggle condition in an pressure ignition engine application, such as a conventional diesel engine application, by substituting fuel injection quantity control to vary engine output torque over a multiplicity of engine cylinder fueling events using the described phase compensator 66 (FIG. 2). Generally, the desired change in engine output torque is then provided, through ordinary skill in the art, via variation in fuel injection quantity at a phase precisely tailored to dampen the chuggle condition, even if such compensation requires a spreading of the fuel injection quantity variation over a number of injection events.

The embodiments of the invention in which a property or privilege is claimed are described as follows:

1. An internal combustion engine torque control method for varying engine output torque to reduce undesirable speed variation of an engine having a plurality of cylinders, each cylinder undergoing a torque producing combustion event in each of repeated engine cycles, comprising the steps of:

identifying an engine speed variation operating condition; and varying the torque produced in engine cylinder combustion events to reduce engine speed variation when the engine speed variation operating condition is identified, by (a) determining a current engine operating angle;

(b) estimating an undesirable engine speed variation at the current engine operating angle;

(c) phase compensating the estimated engine speed variation from the determined current engine operating angle to the engine operating angle at a next cylinder combustion event;

(d) calculating an engine cylinder output torque change value for the next cylinder combustion event as a predetermined function of the phase compensated engine speed change value; and (e) controlling the torque produced at the next cylinder combustion event in accordance with the calculated engine cylinder output torque change value.

2. The method of claim 1, wherein the estimating step further comprises the steps of:

determining a nominal engine speed;

estimating actual engine speed; and determining undesirable engine speed variation as a difference between actual and nominal engine speed.

3. The method of claim 1, wherein the estimating step further comprises the steps of:

determining a nominal change in engine speed;

estimating actual change in engine speed; and determining undesirable engine speed variation as a function of the difference between nominal and actual change in engine speed.

4. The method of claim 1, wherein the phase compensating step projects the undesirable engine speed variation from the current engine operating angle to the engine operating angle at the next cylinder combustion event to determine the magnitude of the undesirable engine speed variation at the next cylinder combustion event.

5. The method of claim 1, wherein the step of varying the torque produced at the next cylinder combustion event further comprises the steps of:

generating a change in timing of the next cylinder combustion event that will substantially provide for the calculated engine cylinder output torque change value; and varying the time of ignition of the next cylinder combustion event by the generated change in timing.

6. The method of claim 1, wherein the step of varying the torque produced at the next cylinder combustion event further comprises the steps of:

generating a fuel command change that will substantially provide for the calculated engine cylinder output torque change value; and varying fuel delivered for combustion at the next cylinder combustion event by the generated fuel command change.

7. An internal combustion engine torque control method for damping engine speed disturbances by controlling torque production of engine cylinder combustion events in which an air/fuel mixture is ignited in engine cylinders, comprising the steps of:

detecting a presence of an engine speed disturbance; and for each of a plurality of engine cylinder combustion events following a detected presence of the engine speed disturbance, (a) identifying the engine operating angle at the combustion event, (b) defining an engine cylinder event prior to the combustion event and identifying the engine operating angle at the defined engine cylinder event, (c) estimating the engine speed disturbance magnitude at the defined engine cylinder event, (d) phase compensating the engine speed disturbance to project the engine speed disturbance magnitude at the combustion event, (e) determining an engine cylinder torque change opposing the projected engine speed disturbance magnitude, and (f) controlling torque production at the engine cylinder combustion event in accord with the determined engine cylinder torque change to damp the engine speed disturbance.

8. The method of claim 7, wherein the step of detecting a presence of an engine speed disturbance further comprises the steps of:

estimating a time rate of change in engine speed;

determining a nominal time rate of change in engine speed;

calculating a difference value representing a difference between the estimated time rate of change in engine speed and the nominal time rate of change in engine speed; and detecting the presence when the calculated difference exceeds a predetermined difference threshold.

9. The method of claim 7, wherein the phase compensating step further comprises the step of applying the estimated engine speed disturbance magnitude to a digital phase compensator process.

10. The method of claim 7, wherein the step of controlling torque further comprises the steps of:

referencing a base cylinder combustion control command;

calculating a combustion control command variation as a predetermined function of the determined engine cylinder torque change;

varying the base control command by the combustion control command variation; and controlling combustion at the combustion event in accordance with the varied base control command.

11. The method of claim 10, wherein the base control command is a base ignition timing command indicating the base engine operating angle at which the combustion event occurs, and wherein the combustion control command variation is an ignition timing variation for varying the timing at which the combustion event occurs to vary the torque contribution of the combustion event.

12. The method of claim 10, wherein the base control command corresponds to a base fuel quantity to be delivered to the cylinder for ignition therein during the combustion event, and wherein the combustion control command variation is a fuel quantity change for varying the quantity of fuel to be delivered to the cylinder for ignition therein during the combustion event.

* * * * *